US012567727B2

(12) United States Patent
Hollifield

(10) Patent No.: US 12,567,727 B2
(45) Date of Patent: Mar. 3, 2026

(54) ELECTRICAL OUTLET SYSTEM

(71) Applicant: Easy Outlet LLC, Canton, GA (US)

(72) Inventor: Joseph Hollifield, Canton, GA (US)

(73) Assignee: Easy Outlet LLC, Canton, GA (US)

( * ) Notice: Subject to any disclaimer, the term of this patent is extended or adjusted under 35 U.S.C. 154(b) by 274 days.

(21) Appl. No.: 18/360,489

(22) Filed: Jul. 27, 2023

(65) Prior Publication Data

US 2025/0038499 A1     Jan. 30, 2025

(51) Int. Cl.
*H02G 3/08* (2006.01)
*H02G 3/14* (2006.01)
*H02G 3/16* (2006.01)

(52) U.S. Cl.
CPC .............. *H02G 3/081* (2013.01); *H02G 3/14* (2013.01); *H02G 3/16* (2013.01)

(58) Field of Classification Search
CPC .......... H02G 3/08; H02G 3/081; H02G 3/086; H02G 3/10; H02G 3/12; H02G 3/121; H05K 5/00; H05K 5/02; H01R 13/46; H01R 13/53
USPC ....... 174/480, 481, 50, 53, 57, 58, 559, 520; 220/3.2–3.9, 4.02; 248/906
See application file for complete search history.

(56) References Cited

U.S. PATENT DOCUMENTS

| | | | | | |
|---|---|---|---|---|---|
| 2,410,287 | A | * | 10/1946 | Jaberg | H01R 24/76 |
| | | | | | 174/53 |
| 2,433,917 | A | * | 1/1948 | McCartney | H01R 25/006 |
| | | | | | 174/59 |
| 3,609,647 | A | * | 9/1971 | Castellano | H01R 27/00 |
| | | | | | 174/53 |
| 3,879,101 | A | * | 4/1975 | McKissic | H01H 1/58 |
| | | | | | 439/535 |
| 4,842,551 | A | * | 6/1989 | Heimann | H01R 27/00 |
| | | | | | 439/549 |
| 5,471,012 | A | * | 11/1995 | Opel | H02G 3/16 |
| | | | | | 174/53 |
| 6,201,187 | B1 | | 3/2001 | Burbine | |
| 6,617,511 | B2 | * | 9/2003 | Schultz | H01R 27/00 |
| | | | | | 174/53 |
| 6,945,815 | B1 | | 9/2005 | Mullally | |
| 7,273,392 | B2 | | 9/2007 | Fields | |
| 7,294,017 | B2 | | 11/2007 | Scott | |
| 7,569,771 | B2 | | 8/2009 | Nicholson | |
| 8,388,371 | B2 | | 3/2013 | Gorman | |

(Continued)

*Primary Examiner* — Angel R Estrada
(74) *Attorney, Agent, or Firm* — Briggs Intellectual Property Law; Jeremy A. Briggs

(57) ABSTRACT

An outlet system is disclosed. The system may include a receptacle and an insert module. The receptacle may include a first junction box, a receptacle outlet and a hollow frame. The first junction box may receive electrical wiring, and may include first slots at a first junction box back wall. The receptacle outlet may be inserted in the first junction box and connected to the electrical wiring via the first slots. The hollow frame may include frame front edges and frame back edges, and the back frame edges may be configured to attach to the first junction box front edges. The insert module may include a second junction box and an insert outlet. The second junction box may include second slots and may be inserted in the hollow frame. The insert outlet may be inserted in the second junction box, and attached to the receptacle outlet via the second slots.

19 Claims, 9 Drawing Sheets

(56)  References Cited

U.S. PATENT DOCUMENTS

| | | | | |
|---|---|---|---|---|
| 8,415,561 | B2 * | 4/2013 | Gates | H01R 13/748 |
| | | | | 174/59 |
| 8,690,601 | B2 | 4/2014 | Perritt | |
| 8,752,972 | B2 * | 6/2014 | Bonarirgo | H05B 47/14 |
| | | | | 362/95 |
| 8,921,694 | B2 | 12/2014 | Moss | |
| 9,437,978 | B2 | 9/2016 | Green | |
| 9,564,725 | B1 | 2/2017 | Moss | |
| 9,991,636 | B2 | 6/2018 | Derousse | |
| 10,170,878 | B1 | 1/2019 | Reulman | |
| D887,983 | S | 6/2020 | Altonen et al. | |
| 10,680,395 | B2 * | 6/2020 | Chadwell | H02G 3/081 |
| 12,119,632 | B2 * | 10/2024 | Rice | H02G 3/16 |
| 2002/0185296 | A1 | 12/2002 | Schultz et al. | |
| 2008/0011501 | A1 | 1/2008 | Gates et al. | |
| 2012/0094511 | A1 | 4/2012 | Sil | |
| 2018/0198640 | A1 | 7/2018 | Nejah et al. | |
| 2019/0156127 | A1 | 5/2019 | Richardson et al. | |

* cited by examiner

218

214

216a,
216b

216

216c1

216c

216c2

104

212

210

208

204

206

206a,
206b

102

202

200

ELECTRICAL OUTLET SYSTEM

TECHNICAL FIELD

The present disclosure relates to an outlet system, and more specifically to an electrical outlet system that enables a user to conveniently replace an electrical outlet without requiring professional assistance.

BACKGROUND

Electrical equipment such as electrical outlets (also known as electrical sockets, plugs, etc.) are installed in both residential and commercial buildings. An electrical outlet is used to connect an electrical appliance (e.g., heater, mixer, fan, refrigerator, electronic components, etc.) to an electrical supply.

While electrical outlets typically have long operational life, there may be instances where a user may need to change or replace an electrical outlet. For example, the user may change the electrical outlet when the electrical outlet develops a fault or when the user may be modifying home décor. In order to change the electrical outlet, the user may need to unscrew electrical wires from the existing outlet and connect the wires to a new outlet. Changing the electrical outlet by removing and connecting electrical wires may be a tedious process and may not be safe. Users typically seek professional assistance for changing electrical outlets; however, such assistance may expensive and may not be readily available.

Thus, there exists a need for an outlet system that enables the user to change the electrical outlet easily and quickly, without requiring professional assistance.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
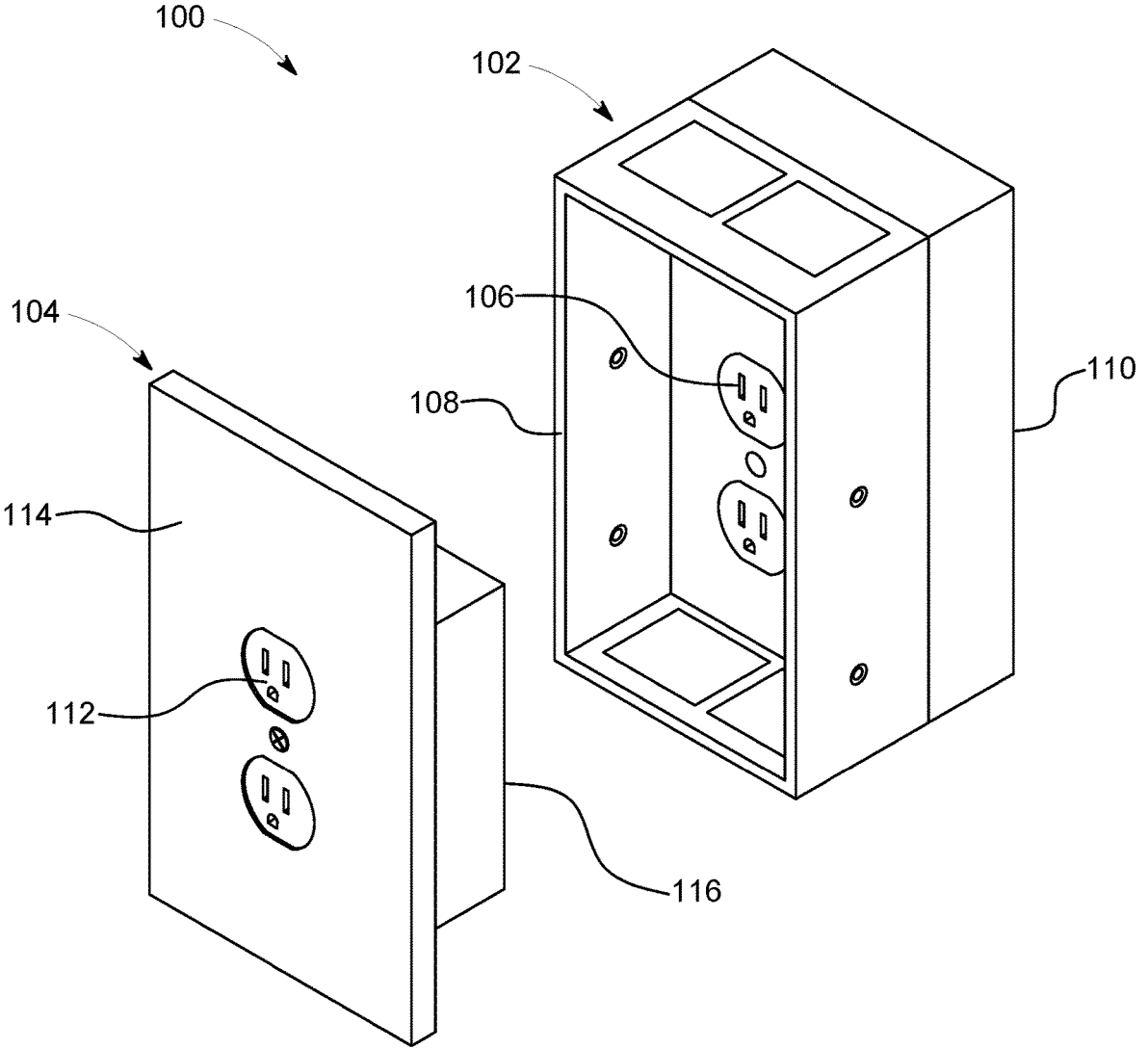
FIG. 1 depicts an example an outlet system in accordance with the present disclosure.

The present disclosure is directed towards an electrical outlet system. The electrical outlet system may include a receptacle and an insert module that may be removably attached to each other. The receptacle may be attached to a wall (e.g., dry wall) and the insert module may be removably attached over the receptacle. A user may conveniently replace a faulty insert module with a new insert module in the receptacle, without requiring to unscrew and/or attach any electrical wiring. The receptacle may include a first junction box in which a receptacle outlet may be inserted and enclosed. Specifically, the first junction box may include an open end that may be configured to receive the receptacle outlet. The first junction box may receive electrical wiring from a utility power supply, and the electrical wiring may be connected to connectors associated with the receptacle outlet. The insert module may include a second junction box and an insert outlet. The second junction box may include an open end that may be configured to receive the insert outlet. In some aspects, connectors associated with the insert outlet may be attached to the receptacle outlet when the insert module may be removably inserted in the receptacle.

In some aspects, the first junction box may include a first lid and a second lid at a first junction box back wall. The first lid and the second lid may be hinged at a first junction box middle portion. Each of the first lid and the second lid may include an aperture to receive the electrical wiring. In addition, each of the first lid and the second lid may include a cavity enclosed between lid walls. The cavity may store electrical connectors that may secure the electrical wiring in the first junction box.

In some aspects, the receptacle may additionally include a hollow frame (or a hollow cuboidal box) that may include front frame edges and back frame edges. The back frame edges may be attached to front first junction box edges. The hollow frame may be configured to receive the second junction box via the front frame edges. The hollow frame may enable secure connection between the insert module and the receptacle.

The present disclosure discloses an electrical outlet system that may enable a user to quickly and easily replace a faulty outlet (e.g., a faulty insert outlet). For example, the user may simply pull (or unplug) the existing insert module (or detach the insert module from the receptacle), and then insert or plug a new insert module into the receptacle. Thus, the user may not be required to unscrew or attach electrical wires while replacing faulty outlet components, thereby enabling safe and easy outlet replacement. Further, the user may not require professional assistance to replace the outlet, thus saving cost and enhancing user convenience.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example outlet system 100 (or electrical outlet system 100) in accordance with the present disclosure.

The outlet system 100 may be configured to connect an electrical device (such as heater, mixer, fan, refrigerator, electronic components, etc., not shown) to an electrical supply. The electrical supply may be, for example, utility power supply. The outlet system 100 may be configured to be mounted on a wall (not shown) of a building. Such building may include residential or commercial building, or any other structure including walls.

The outlet system 100 may include a receptacle 102 and an insert module 104. The receptacle 102 may be inserted inside the wall and configured to receive electrical wiring connected with the utility power supply. The electrical wiring may include a hot wire, a neutral wire, and a ground wire. In some aspects, the receptacle 102 may include a receptacle outlet 106 having metal connectors ("first metal connectors", not shown in FIG. 1) that may be disposed at a receptacle outlet back surface and may be connected to the electrical wiring.

The receptacle 102 may further include a receptacle front portion 108 and a receptacle back portion 110. The receptacle back portion 110 may face towards the wall, and the receptacle front portion 108 may have a hollow portion (as shown in FIG. 1) or include an opening to receive the insert module 104.

The insert module 104 may be removably attached to or inserted into the receptacle 102. Specifically, a portion of the insert module 104 may be inserted in the receptacle 102. The insert module 104 may include an insert outlet 112 having metal connectors ("second metal connectors", not shown) that may be disposed at an insert outlet back surface and may be configured to removably connect with the receptacle outlet 106, when the insert module 104 may be inserted in the receptacle 102. In some aspects, insert outlet dimensions/structure may be same as receptacle outlet dimensions/structure.

The insert module 104 may further include an insert front portion 114 and an insert back portion 116. The insert back portion 116 may face towards the receptacle front portion 108, when the insert module 104 may be inserted in the receptacle 102. The details of the receptacle 102 and the insert module 104 are described later below in conjunction with FIGS. 2-6.

A user may conveniently remove and exchange one or more components of the outlet system 100 (e.g., the insert module 104) when the components develop fault. The user may not require professional assistance to exchange the components. For example, to exchange the insert module 104, the user may remove the existing insert module 104 by "pulling" (or unplugging) the insert module 104 from the receptacle 102, and then inserting (or plugging) a new insert module into the receptacle 102. The user may not be required to unscrew or attach electrical wires while replacing faulty outlet components, thereby enabling safe and easy outlet replacement.

Figure 2A:
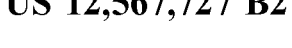
FIGS. 2A-2C depict exploded side views of an example outlet system in accordance with the present disclosure.
Figure 2B:
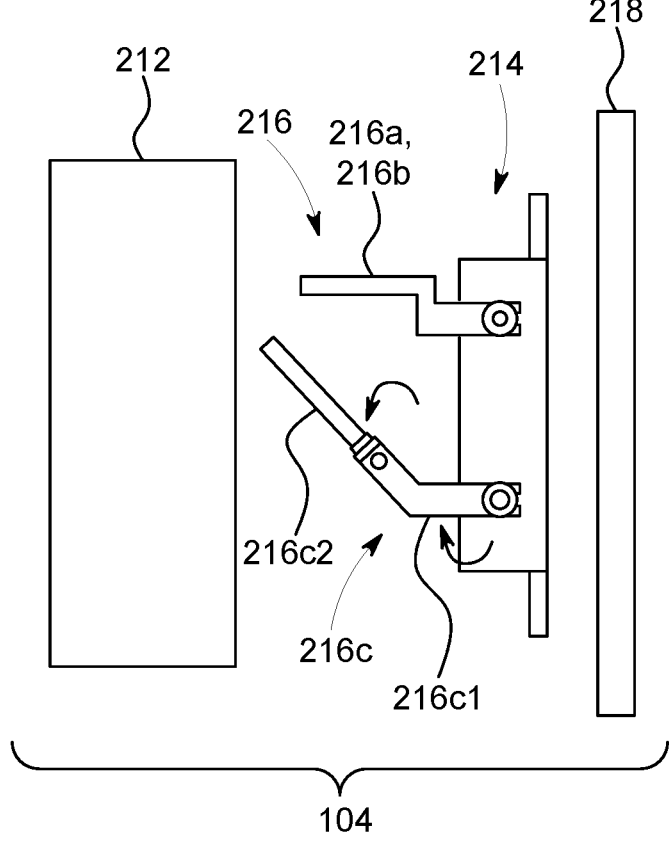
Figure 2C:
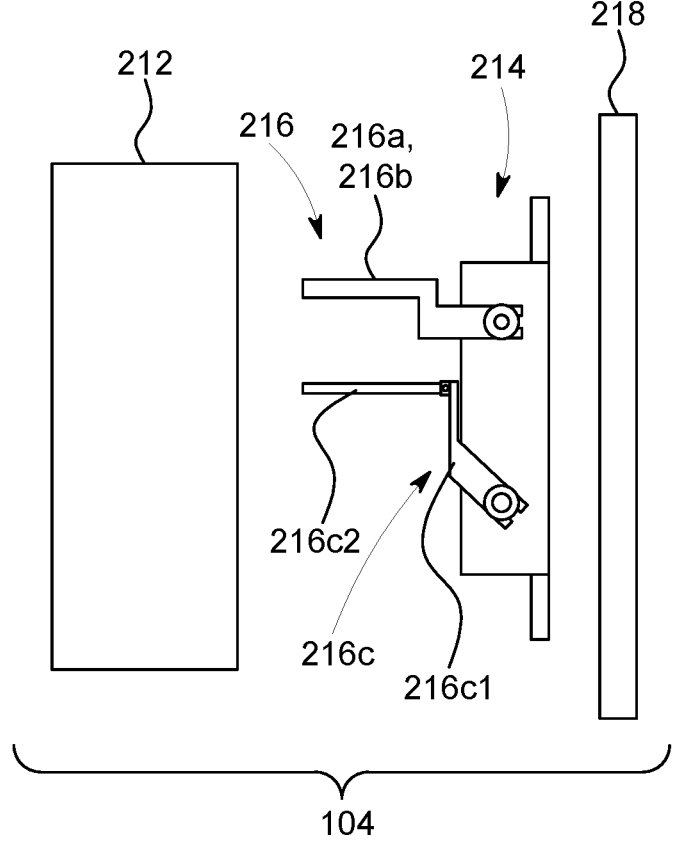

FIGS. 2A-2C depict exploded side views of an example outlet system 200 in accordance with the present disclosure. Specifically, FIG. 2A depicts exploded side view of complete outlet system 200. FIG. 2B depicts a first exploded side view of a portion (e.g., the insert module 104) of the outlet system 200. FIG. 2C depicts a second exploded side view of the portion (e.g., the insert module 104) of the outlet system 200.

Figure 3:
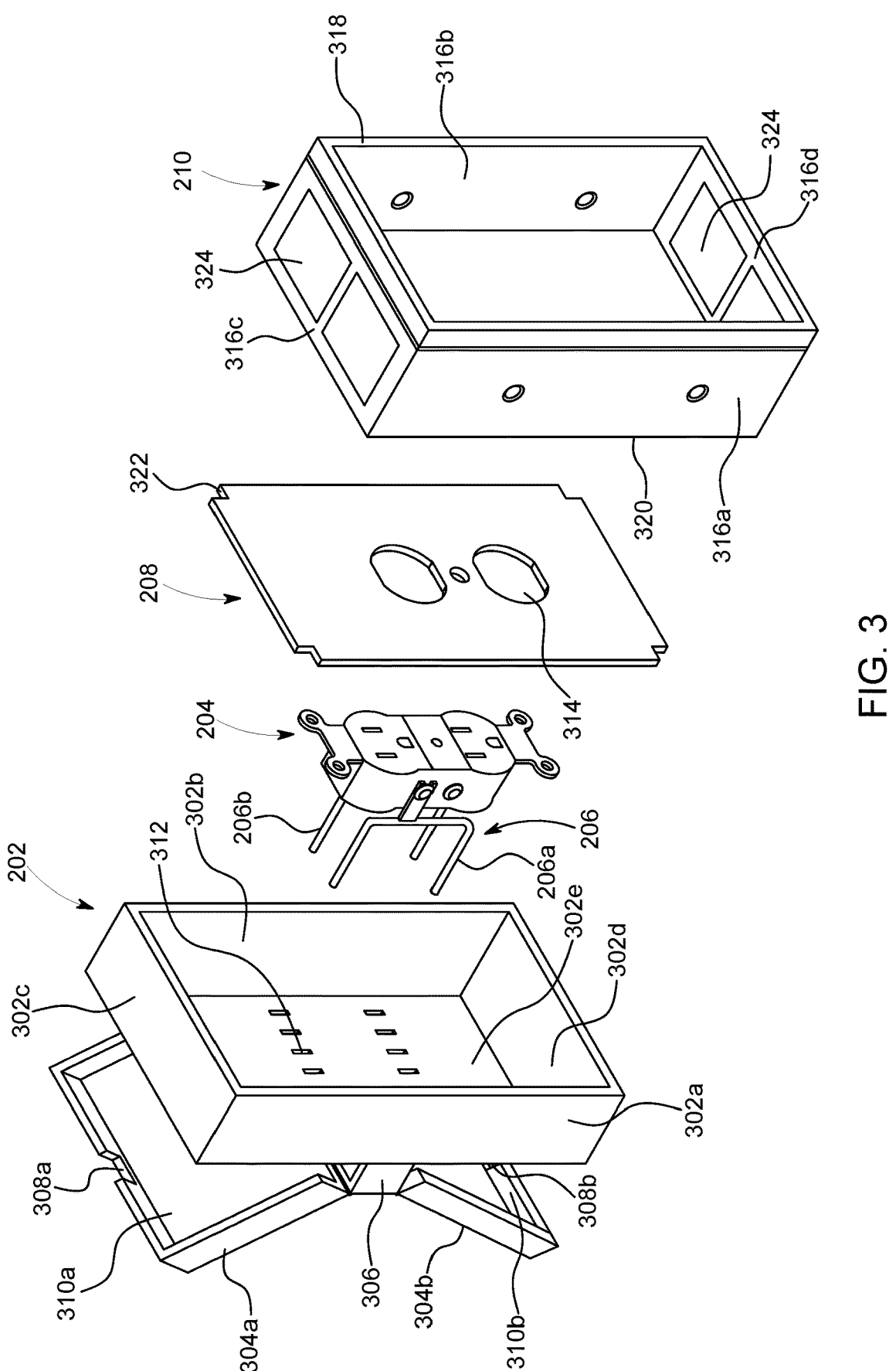
FIG. 3 depicts an exploded front isometric view of a receptacle in accordance with the present disclosure.
Figure 4:
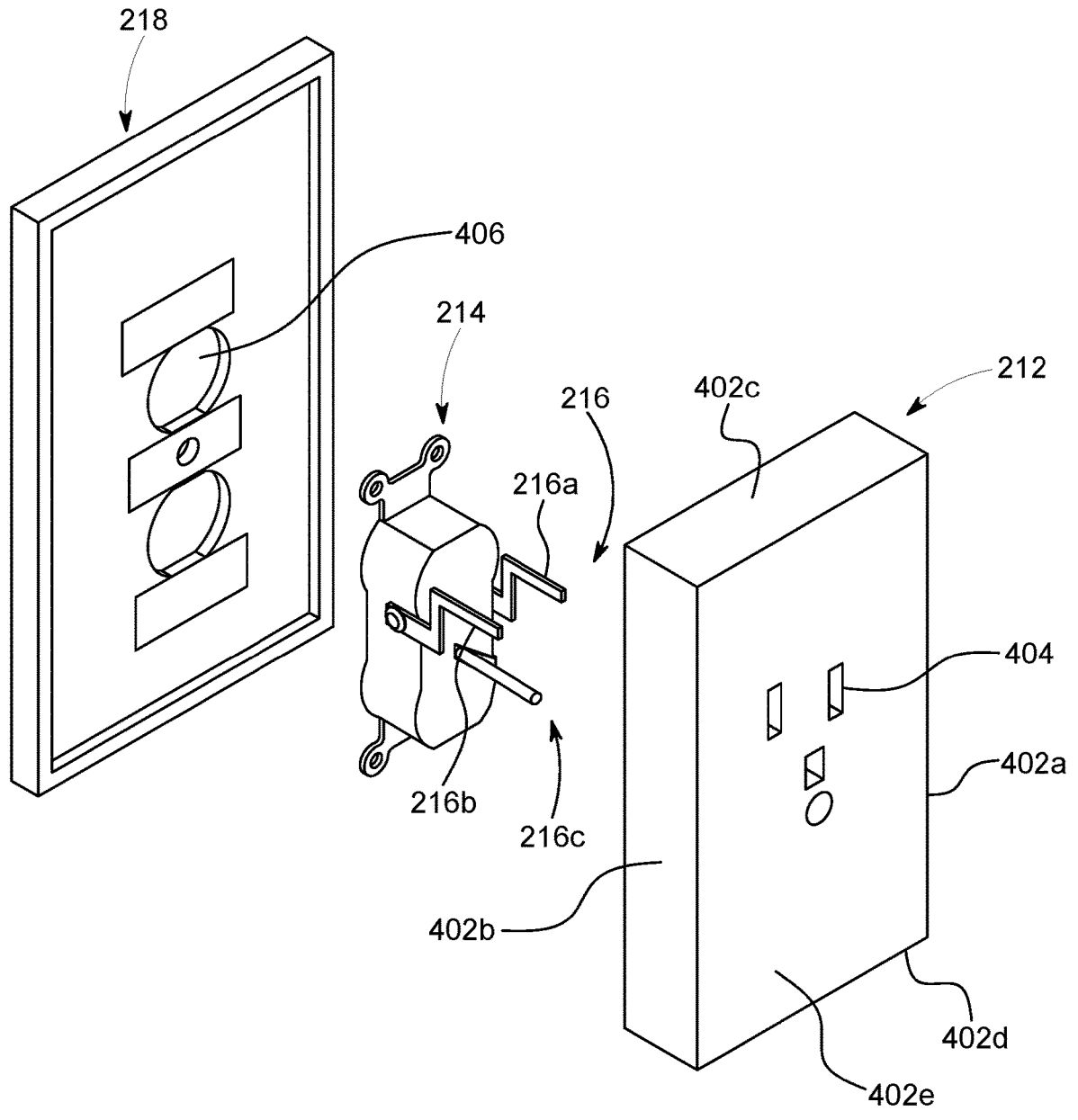
FIG. 4 depicts an exploded back isometric view of an insert module in accordance with the present disclosure.
Figure 5:
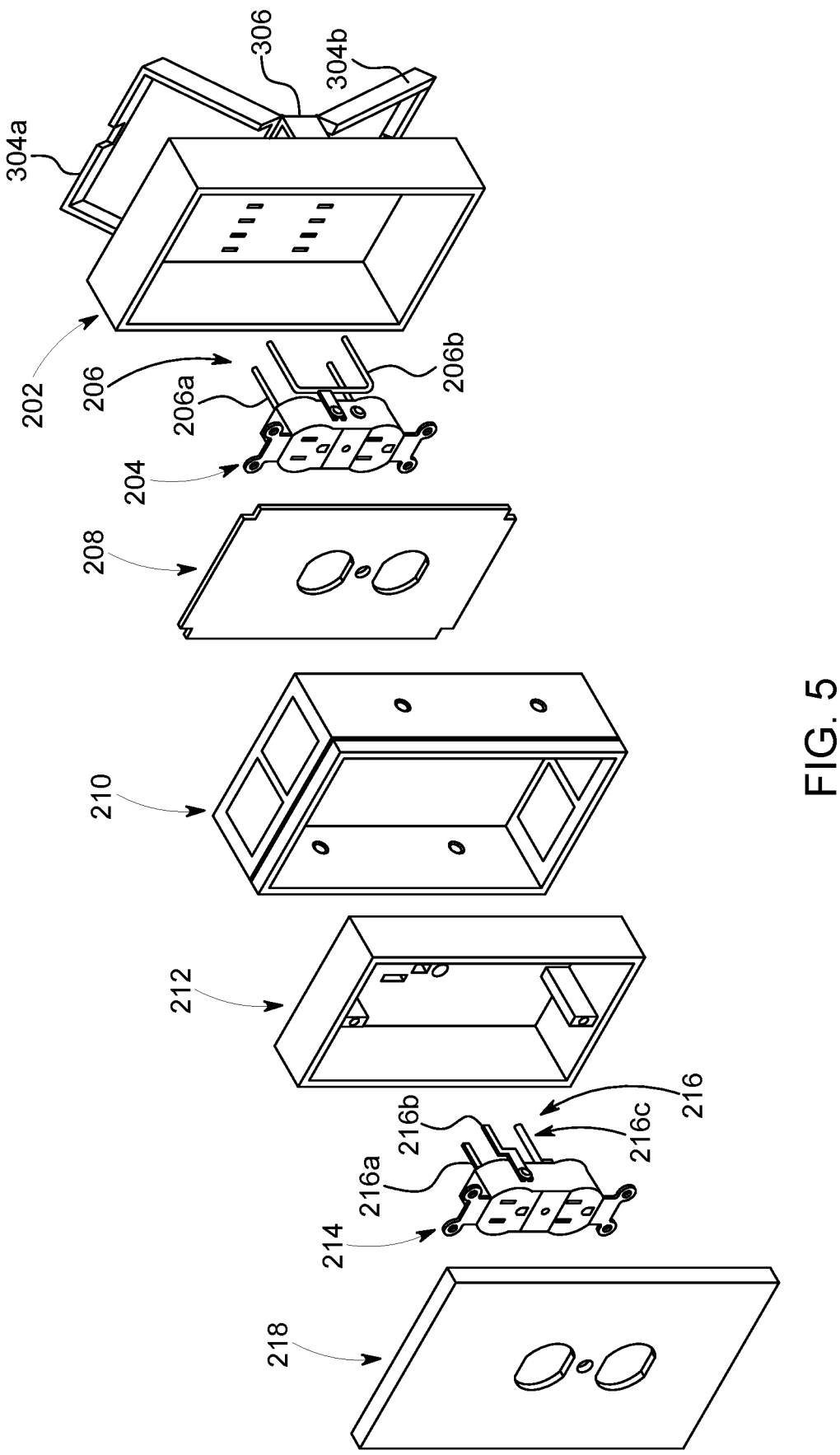
FIG. 5 depicts an exploded front isometric view of the outlet system of FIG. 2A in accordance with the present disclosure.
Figure 6:
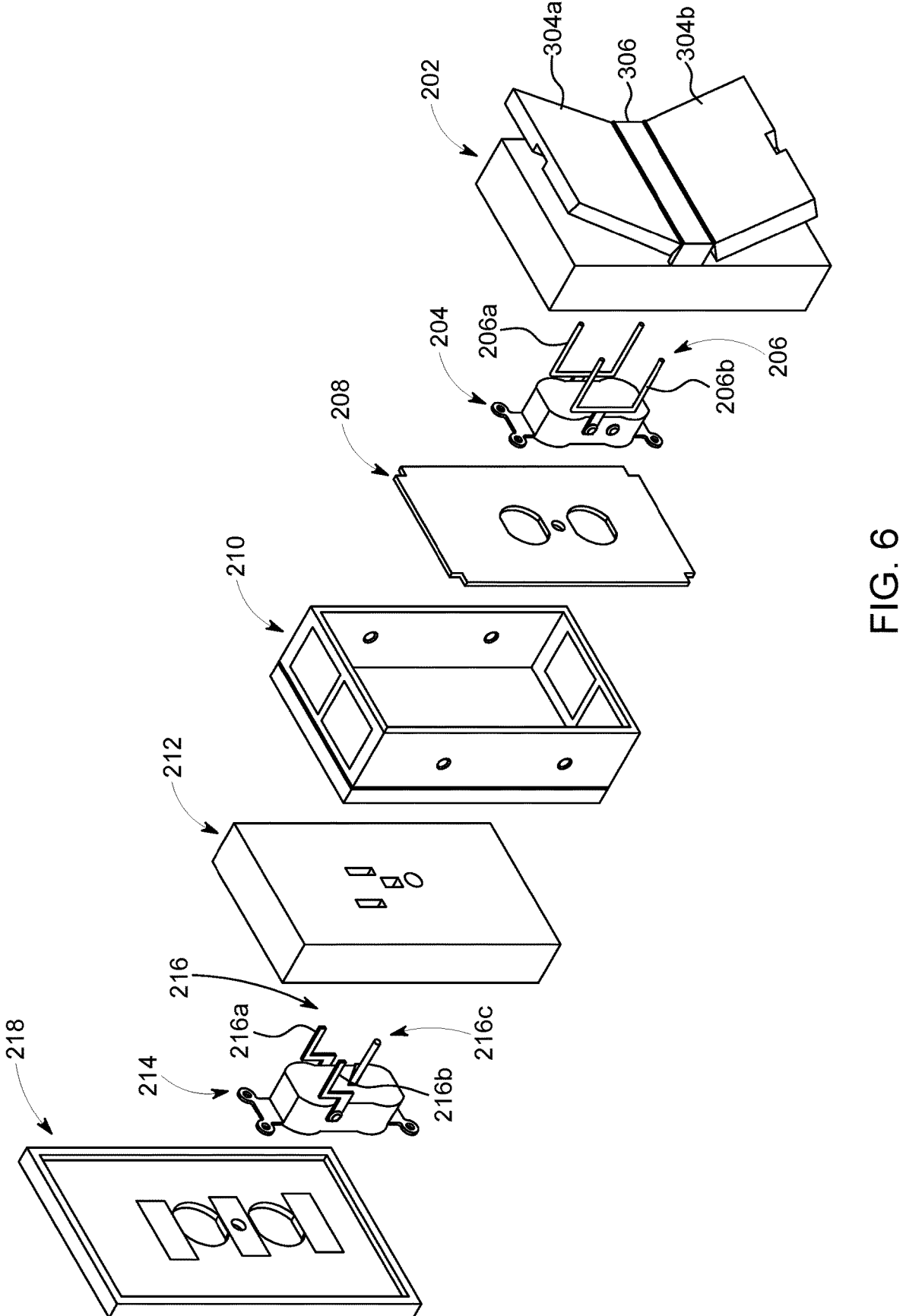
FIG. 6 depicts an exploded back isometric view of the outlet system of FIG. 2A in accordance with the present disclosure.
Figure 7:
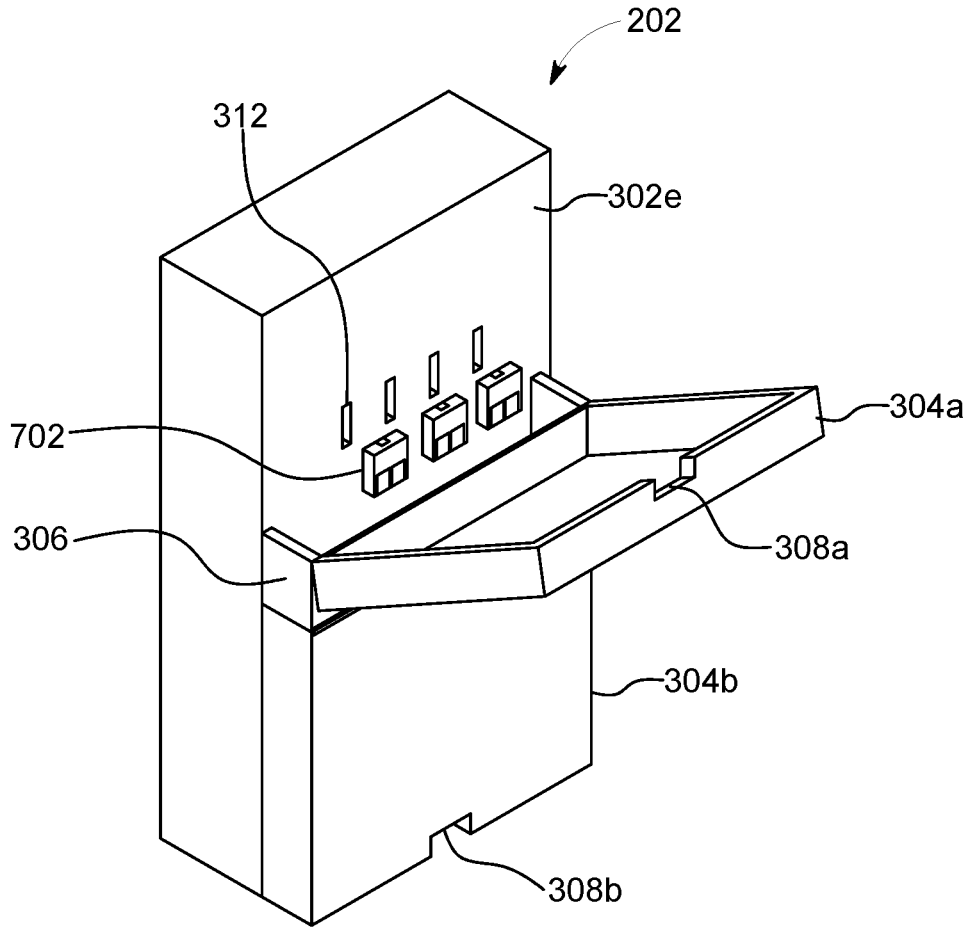
FIG. 7 depicts a back isometric view of a portion of a junction box in accordance with the present disclosure.

The outlet system 200 may be same as the outlet system 100. FIGS. 3-7 will be described together with FIGS. 2A-2C. FIG. 3 depicts an exploded front isometric view of a receptacle (e.g., the receptacle 102), FIG. 4 depicts an exploded back isometric view of an insert module (e.g., the insert module 104). FIGS. 5-6 depict an exploded front isometric view and an exploded back isometric view of the outlet system 200, respectively. FIG. 7 depicts a back isometric view of a portion of a junction box (specifically, a first junction box 202, described below).

As described above, the outlet system 200 may include the receptacle 102 and the insert module 104. The receptacle 102 may include a first junction box 202, a receptacle outlet 204 (same as the receptacle outlet 106) having first metal connectors 206, a first face plate 208, and a hollow frame 210 (or hollow box).

The first junction box 202 may be a cuboidal box that may be open at one end or may include an opening at a first junction box front portion (as shown in FIG. 3). The first junction box 202 may be made of any material including, but not limited to, metal (such as brass, aluminum, stainless steel, etc.) or plastic (such as polycarbonate or Acrylonitrile Butadiene Styrene (ABS)). In some aspects, the first junction box 202 may include a first side wall 302a, a second side wall 302b, a top wall 302c, a bottom wall 302d, and a back wall 302e (as shown in FIG. 3). Each first junction box wall may be disposed perpendicular to adjacent walls. Further, as shown in FIG. 3, the first junction box 202 may not have a front wall, and thus the first junction box 202 may be open from the first junction box front portion. Although the description above describes an aspect where the first junction box 202 is a cuboidal box, the present disclosure is not limited to such a structure and the first junction box 202 may have any other shape, without departing from the present disclosure scope.

In an exemplary aspect, the first junction box 202 may include a first lid 304a and a second lid 304b that may be pivotally attached to the back wall 302e. Specifically, the first lid 304a and the second lid 304b may be pivotally hinged at the back wall 302e, for example, via an attachment member 306 (e.g., a straight structure, as depicted in FIG. 3) disposed at middle portion of a back surface of the back wall 302e. The first lid 304a may be pivotally hinged to the attachment member 306 via a first lid bottom edge, and the first lid 304a may configured to open and detach from the top wall 302c (e.g., in a first lid open state), as shown in FIG. 3. Similarly, the second lid 304b may be pivotally hinged to the attachment member 306 via a second lid top edge, and the second lid 304b may be configured to open and detach from the bottom wall 302d (e.g., in a second lid open state). The first lid 304a and the second lid 304b may be configured to switch between the open state and a closed state (a state in which the first lid 304a may be attached to the top wall 302c and the second lid 304b may be attached to the bottom wall 302d) via respective pivotal hinges at the attachment member 306. In some aspects, the first junction box 202 may include one or more actuators (not shown) at the top wall 302c and/or the bottom wall 302d which may enable the user to open the first lid 304a and the second lid 304b. For example, the user may press the actuator to detach the first lid 304a from the top wall 302c, and move the first lid 304a from the closed state to the open state.

The first junction box 202 may be configured to receive the electrical wiring (including the hot wire, the neutral wire, and the ground wire) from the utility power supply via the first and second lids 304a, 304b. Specifically, the first lid 304a may include a first aperture 308a (e.g., disposed at a first lid top middle portion) and the second lid 304b may include a second aperture 308b (e.g., disposed at a second lid bottom middle portion). The first aperture 308a and the second aperture 308b may be configured to receive the electrical wiring (or enable the electrical wiring to pass through) from the utility power supply and pass the electrical wiring towards the back wall 302e (e.g., towards the attachment member 306).

Each of the first and second lids 304a, 304b may include one or more cavities 310a and 310b enclosed between lid walls. Specifically, the cavities 310a and 310b may be disposed between the back surface of the back wall 302e and respective back walls of the first and second lids 304a, 304b. Each of the first and second lids 304a, 304b may have cuboidal body having side walls and a back wall, and no front wall (thereby forming the cavities 310a, 310b). The cavities 310a and 310b may be configured to enclose/store the electrical wiring that the first and second lids 304a, 304b receive from the utility power supply. Specifically, the cavities 310a and 310b may be configured to store one or more wiring connectors 702 (or electrical connectors configured to hold/secure wiring, shown in FIG. 7) that may receive and secure the electrical wiring in the cavities 310a, 310b. While connecting the first junction box 202 with the electrical wiring, a user may open the first lid 304a and/or the second lid 304b, pass the electrical wiring from the first aperture 308a and the second aperture 308b and attach the electrical wiring to the wiring connectors 702 stored in the cavity 310a and 310b, and then close the first lid 304a and the second lid 304b. When the first lid 304a and the second lid 304b may be closed, the electrical wiring may pass through the first aperture 308a and the second aperture 308b.

As described above, the receptacle 102 may include the receptacle outlet 204 that may be inserted into the first junction box 202 (via the first junction box open front portion). Stated another way, the first junction box 202 may be configured to receive the receptacle outlet 204 and enclose the receptacle outlet 204 (e.g., via the first side wall 302a, the second side wall 302b, the top wall 302c, and the bottom wall 302d). The receptacle outlet 204 may have dimension (e.g., height, width) that may be smaller than first junction box dimensions such that the receptacle outlet 204 may be enclosed inside the first junction box 202. In further aspects, the receptacle outlet 204 may be attached to the first junction box 202 via one or more screws.

The receptacle outlet 204 may include the first metal connectors 206 (e.g., disposed at a receptacle outlet back surface) that may be connected to the electrical wiring via the wiring connectors 702 (disposed in the cavities 310a, 310b, as described above). In some aspects, the first junction box 202 may include one or more slots 312 (e.g., first slots 312) at the back wall 302e through which the first metal connectors 206 may be connected to the wiring connectors 702 (and thus to the electrical wiring). Thus, the first slots 312 may be configured to receive and secure the first metal connectors 206 with the wiring connectors, thereby securing the receptacle outlet 204 in the first junction box 202. In some aspects, a count of first slots 312 may correspond to a count of the first metal connectors 206. In addition, arrangement of the first slots 312 may correspond to arrangement of the first metal connectors 206. Further, a metal connector length may be such that the first metal connectors 206 may easily attach to the wiring connectors. In further aspects, the first metal connectors 206 may include a first "U" shaped connector 206a and a second "U" shaped connector 206b that may be connected to the receptacle outlet 204 via screws located at sidewalls of the receptacle outlet 204.

The receptacle 102 may further include the first face plate 208 that may be disposed between the receptacle outlet 204 and the hollow frame 210. The first face plate 208 may be configured to cover a receptacle outlet front portion/surface. The first face plate 208 may include one or more cut-outs 314, which may be configured to expose a part or portion of the receptacle outlet front surface. In the exemplary aspect depicted in FIG. 3, the first face plate 208 is shown as a rectangular plate; however, in other aspects, the first face plate 208 may have any other shape (e.g., square, circular, oval, etc.), without departing from the present disclosure scope. The first face plate 208 may be disposed between receptacle outlet 204 front surface and a hollow frame back surface/open back end. First face plate dimensions (e.g., width, length) may be equivalent to first junction box dimensions.

As described above, the receptacle 102 may further include the hollow frame 210. The hollow frame 210 may include a hollow cuboidal body (or be a hollow box) having open front and back ends. Specifically, the hollow frame 210 may include a first side wall 316a, a second side wall 316b, a top wall 316c and a bottom wall 316d (as shown in FIG. 3). The hollow frame 210 may include a frame front end 318 and a frame back end 320 that may be open (or may not include any walls). In some aspects, the frame back end 320 may face towards the receptacle outlet front surface. The hollow frame 210 may include frame back edges and frame front edges. For example, the frame back end 320 may include the frame back edges (e.g., four back edges) and the frame front end 318 may include the frame front edges.

Hollow frame dimensions (e.g., length, width, height) may be equivalent to first junction box dimensions. In some aspects, the frame back edges may be attached to first junction box front edges. For example, the top wall 316c may be aligned with the top wall 302c to enable secure attachment between the frame back edges and first junction box front edges. Similarly, the bottom wall 316d may be aligned with the bottom wall 302d. Further, the first side wall 316a and the second side wall 316b may be aligned with the first side wall 302a and the second side wall 302b. Alignment of respective walls described above enables secure attachment between the hollow frame 210 and the first junction box 202.

In addition, the first face plate 208 may be inserted at the frame back end 320 via the frame back edges such that the first face plate 208 may be disposed between the hollow frame 210 and the first junction box 202 (in which the receptacle outlet 204 may be enclosed/inserted). In some aspects, the first face plate 208 may include cuts 322 at each corner that may enable the first face plate 208 to be inserted in the hollow frame 210. Stated another way, the cuts 322 may enable the hollow frame 210 to receive the first face plate 208. In further aspects, the hollow frame 210 may be screwed to the building wall (e.g., dry wall) when the hollow frame 210 may be attached to the first junction box 202.

In some aspects, the hollow frame 210 may include one or more openable recesses 324 disposed at the top wall 316c and the bottom wall 316d. The openable recesses 324 may be configured to receive one or more wires or cables from the top wall 316c and the bottom wall 316d.

The insert module 104 may include a second junction box 212, an insert outlet 214 having second metal connectors 216, and a second face plate 218. The second junction box 212 may include a hollow cuboidal body (or be a hollow cuboidal box) having an open front end similar to the first junction box 202. The second junction box 212 may be made of any material including, but not limited to, metal (such as brass, aluminum, stainless steel etc.) or plastic (such as polycarbonate or Acrylonitrile Butadiene Styrene (ABS)). The second junction box 212 may include a first side wall 402a, a second side wall 402b, a top wall 402c, a bottom wall 402d and a back wall 402e (as shown in FIG. 4), and no front wall. The second junction box 212 may include one or more second slots 404 at the back wall 402e to receive the second metal connectors 216 associated with the insert outlet 214. In some aspects, the metal connectors 216 may be "inserted into" or connected with the receptacle outlet 204 via the second slots 404, thereby connecting the insert outlet 214 with the receptacle outlet 204 (that is connected with the electrical wiring). In this manner, the insert outlet 214 may be connected with the electrical wiring.

In some aspects, the second metal connectors 216 may include a first "Z" shaped connector 216a, a second "Z" shaped connector 216b, and a third connector 216c (e.g., connector for neutral wiring), which are connected to the insert outlet 214 via screws located at sidewalls of the insert outlet 214. In further aspects, the third connector 216c may include a first portion "216c1" and a second portion "216c2" (as shown in FIGS. 2A-2C). The first portion "216c1" may be pivotally connected with the second portion "216c2". The first portion "216c1" may be connected to the insert outlet 214 via screws located at sidewalls of the insert outlet 214, and the second portion "216c2" may be configured to be inserted in the second slots 404.

In some aspects, the first portion "216c1" and the second portion "216c2" may be configured to bend such that the second portion "216c2" may be inserted in the second slots 404. A bent position of the first portion "216c1" and the second portion "216c2" is shown in FIG. 2A and FIG. 2C, and an unbent position of the first portion "216c1" and the second portion "216c2" is shown in FIG. 2B. Specifically, the first portion "216c1" may be configured to bend such that a part of the first portion "216c1" may be coplanar with a back surface of the insert outlet 214, and the second portion "216c2" may be configured to bend such that the second portion "216c2" may be perpendicular to the back surface of the insert outlet 214.

Second junction box dimensions (length, width, height) may be smaller than hollow frame dimensions such that the second junction box 212 may be inserted into the hollow frame 210. In some aspects, the second junction box 212 may be inserted from the frame front end 318 via the frame front edges. The hollow frame 210 may be configured to enclose the second junction box 212.

The insert outlet 214 may be inserted and secured into the second junction box 212. The insert outlet 214 may have dimensions (e.g., height, width) that may be smaller than the second junction box dimensions such that the insert outlet 214 may be enclosed inside the second junction box 212. In some aspects, the insert outlet 214 may have same dimensions/structure as the receptacle outlet 204.

The insert outlet 214 may include the second metal connectors 216 that may be connected to the receptacle outlet 204, via the second slots 404, when the insert module 104 is inserted into the receptacle 102, as described above. In some aspects, a count of second slots 404 may correspond to a count of the metal connectors 216. In addition, arrangement of the second slots 404 may correspond to arrangement of the metal connectors 216. Further, a length of the metal connector 216 may be such that the metal connector 216 may easily attach with the receptacle outlet 204.

The insert module 104 may further include the second face plate 218 that may be disposed over an insert outlet front surface, and may be configured to cover insert outlet portion. The second face plate 218 may be a rectangular plate similar to the first face plate 208. The second face plate 218 may include one or more cut-outs 406 (as shown in FIG. 4) that may be configured to expose a part/portion of the insert outlet 214. A user may insert a plug of an electric appliance into the insert outlet 214 to power the electric appliance.

In some aspects, second face plate dimensions/structure may be equivalent to the hollow frame dimensions. The second face plate back surface may be attached to the frame front edges. In some aspects, the second face plate 218 may be magnetically attached/coupled to the frame front edges such that the user may not be required to use any tool to unscrew the insert module 104 to replace the insert outlet 214 (e.g., a faulty insert outlet).

In operation, when the user desires to replace a damaged or faulty outlet, the user may pull the second face plate 218 (that may be magnetically attached to the hollow frame 210) from the receptacle 102. When the second face plate 218 may be removed, the user may pull the insert outlet 214 from the second junction box 212. When the user pulls the insert outlet 214, the second connectors 216 associated with the insert outlet 214 may be detached from the receptacle outlet 204. The user may then insert a new insert outlet in the second junction box 212 and may attach new connectors associated with the new insert outlet with the receptacle outlet 204. Thus, the user may simply unplug and re-plug the insert outlet to replace the insert outlet.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. An outlet system comprising:
a receptacle comprising:
a first junction box having a first lid and a second lid disposed on a first junction box back wall, wherein the first lid and the second lid are configured to receive electrical wiring, and wherein the first junction box comprises one or more first slots at the first junction box back wall;
a receptacle outlet configured to be inserted in the first junction box, wherein the receptacle outlet comprises a first metal connector configured to be connected to the electrical wiring via the one or more first slots; and
a hollow frame comprising frame front edges and frame back edges, wherein the frame back edges are configured to attach to first junction box front edges; and
an insert module comprising:
a second junction box having one or more second slots at a second junction box back wall, wherein the second junction box is configured to be inserted in the hollow frame via the frame front edges; and
an insert outlet configured to be inserted in the second junction box,
wherein the insert outlet comprises a second metal connector configured to be connected to the receptacle outlet via the one or more second slots when the insert module is inserted into the receptacle.

2. The outlet system of claim 1, wherein each of the first lid and the second lid comprises an aperture to receive the electrical wiring.

3. The outlet system of claim 1, wherein each of the first lid and the second lid is hinged at a first junction box middle portion.

4. The outlet system of claim 1, wherein each of the first lid and the second lid comprises a cavity enclosed between lid walls, and wherein the cavity is configured to store electrical connectors that secure the electrical wiring in the first junction box.

5. The outlet system of claim 1, wherein the receptacle further comprises a first face plate configured to be disposed between the receptacle outlet and the hollow frame, wherein the first face plate is configured to cover a front surface of the receptacle outlet, and wherein the first face plate comprises one or more first cut-outs to expose one or more portions of the receptacle outlet.

6. The outlet system of claim 5, wherein the first face plate is configured to be inserted at a frame back end via the frame back edges.

7. The outlet system of claim 1, wherein the insert module further comprises a second face plate configured to be disposed over a front surface of the insert outlet, wherein the second face plate is configured to cover the insert outlet, and wherein the second face plate comprises one or more second cut-outs to expose one or more portions of the insert outlet.

8. The outlet system of claim 7, wherein the second face plate is configured to attach to the frame front edges.

9. The outlet system of claim 1, wherein the hollow frame comprises an openable recess at a frame top wall and a frame bottom wall.

10. The outlet system of claim 1, wherein the hollow frame has a hollow cuboidal body.

11. The outlet system of claim 1, wherein a front end of each of the first junction box and the second junction box is open.

12. The outlet system of claim 1, wherein each of the first junction box and the second junction box has a cuboidal body.

13. An outlet system comprising:
a receptacle comprising:
a first junction box configured to receive electrical wiring, wherein the first junction box comprises one or more first slots at a first junction box back wall; and
a receptacle outlet configured to be inserted in the first junction box, wherein the receptacle outlet comprises a first metal connector configured to be connected to the electrical wiring via the one or more first slots; and
an insert module comprising:
a second junction box having one or more second slots at a second junction box back wall; and
an insert outlet configured to be inserted in the second junction box,
wherein the insert outlet comprises a second metal connector configured to be connected to the receptacle outlet via the one or more second slots when the insert module is inserted into the receptacle.

14. The outlet system of claim 13, wherein the first junction box comprises a first lid and a second lid disposed on the first junction box back wall, and wherein the first lid and the second lid are configured to receive the electrical wiring.

15. The outlet system of claim 14, wherein each of the first lid and the second lid comprises an aperture to receive the electrical wiring.

16. The outlet system of claim 14, wherein each of the first lid and the second lid is hinged at a first junction box middle portion.

17. The outlet system of claim 14, wherein each of the first lid and the second lid comprises a cavity enclosed between lid walls, and wherein the cavity is configured to store electrical connectors that secure the electrical wiring in the first junction box.

18. The outlet system of claim 13, wherein the receptacle further comprises a hollow frame having frame front edges and frame back edges, and wherein the frame back edges are configured to attach to first junction box front edges.

19. The outlet system of claim 18, wherein the second junction box is configured to be inserted in the hollow frame via the frame front edges.

\* \* \* \* \*